(12) United States Patent
Fugleberg et al.

(10) Patent No.: US 7,615,100 B2
(45) Date of Patent: Nov. 10, 2009

(54) METHOD FOR THE PRECIPATION OF SILICA IN CONNECTION WITH ZINC ORE LEACHING

(75) Inventors: Sigmund Fugleberg, Eerikinkatu (FI); Pertti Pekkala, Vehaksentie (FI); Panu Talonen, Ketotie (FI); Marja Riekkola-Vanhanen, Orapihlajantie (FI)

(73) Assignee: Outotec Oyj, Espoo (FI)

( * ) Notice: Subject to any disclaimer, the term of this patent is extended or adjusted under 35 U.S.C. 154(b) by 238 days.

(21) Appl. No.: 10/471,528

(22) PCT Filed: Mar. 8, 2002

(86) PCT No.: PCT/FI02/00182

§ 371 (c)(1),
(2), (4) Date: Sep. 10, 2003

(87) PCT Pub. No.: WO02/072896

PCT Pub. Date: Sep. 19, 2002

(65) Prior Publication Data

US 2004/0074340 A1    Apr. 22, 2004

(51) Int. Cl.
  *C22B 3/08*    (2006.01)
(52) U.S. Cl. ........................................... 75/743
(58) Field of Classification Search .............. 75/711, 75/431, 743; 423/141, 138
See application file for complete search history.

(56) References Cited

U.S. PATENT DOCUMENTS

| 2,874,041 | A | | 2/1959 | Radino ........................ 75/120 |
| 3,656,941 | A | | 4/1972 | Matthew et al. ............... 75/119 |
| 3,954,937 | A | | 5/1976 | Bodson ...................... 423/101 |
| 4,252,775 | A | | 2/1981 | Davister et al. ............... 423/98 |
| 4,399,109 | A | | 8/1983 | Iler et al. .................... 423/141 |
| 5,120,353 | A | * | 6/1992 | Fugleberg et al. ............. 75/419 |
| 5,585,079 | A | | 12/1996 | Fugleberg .................. 423/109 |
| 5,858,315 | A | * | 1/1999 | Van Put et al. .............. 423/109 |

FOREIGN PATENT DOCUMENTS

EP    0 851 034 A1    7/1998
GB        104697    *    3/1917

OTHER PUBLICATIONS

Boyanov et al., "Phase content of Semi-finished products in zinc production", Thermochimica Acta, 93 (1985), pp. 733-736.*
Webster's Seventh New Collegiate Dictionary, G.C. Merriam Co., 1965, p. 809.*

* cited by examiner

*Primary Examiner*—Roy King
*Assistant Examiner*—Jie Yang
(74) *Attorney, Agent, or Firm*—Buchanan Ingersoll & Rooney PC

(57) ABSTRACT

The invention relates to a method for the leaching of oxidized ores and in particular zinc ores. The ore, wherein the valuable metals are at least partially in silicate form, are routed to an acidic leaching stage in conditions where the silicate decomposes and the valuable metal ion comes into the solution. During leaching the silicate ion first dissolves, but simultaneously decomposes and is precipitated as silica.

17 Claims, 2 Drawing Sheets

METHOD FOR THE PRECIPATION OF SILICA IN CONNECTION WITH ZINC ORE LEACHING

BACKGROUND

1. Field

Disclosed herein is a method for the leaching of oxidized ores and in particular zinc ores. The ore, wherein the valuable metals are at least partially in silicate form, are routed to an acidic leaching stage in conditions where the silicate decomposes and the valuable metal ion comes into the solution. During leaching the silicate ion first dissolves, but simultaneously decomposes and is precipitated as silica.

2. Description of Related Art

The majority of the world's reserves of zinc occur in so called oxidized ore, where the zinc is bound to silicates and carbonates. Such are for instance smithsonite ($ZnCO_3$) and willemite ($2ZnO.S_iO_2$) and mixtures of these minerals. Zinc-containing siliceous slags also exist, which originate mainly from the production of lead. Thus in the text the terms ore or raw material are also used to mean other zinc-containing siliceous raw materials than actual ores. Industrially these ores are utilized both pyrometallurgically and hydrometallurgically. Hydrometallurgical utilization occurs by leaching. The carbonate portion does not cause any major difficulties in leaching, but on the other hand the siliceous fraction is hard to control. Various processes have been proposed to overcome these difficulties.

U.S. Pat. No. 4,148,862 describes how the problem of siliceous zinc ores relates to the precipitation of silica, $SiO_2$, and especially the morphology of silica. In industrial operation, the precipitation rate in particular is problematic. In the US publication in question, there is a diagram that illustrates the dependence of the stability of silica gel in an aqueous solution on the pH value. This shows that the precipitation rate of silica is at its best in a very acidic solution and again in a pH range of 3-5, but that a pH of 2 is very unfavorable for precipitation. It is clear from the patent text that the problems arising in connection with a siliceous zinc ore are quite different from those in normal zinc processes, in which the raw material is a sulphidic concentrate.

At least three ways have been proposed to combat the problem of a siliceous zinc concentrate. The first of these is described in for instance U.S. Pat. No. 3,656,941, where the leaching of a siliceous material performed in acidic conditions is rapid, so that the decomposed silica remains in solution. The solution is transferred to a second stage, where the $SiO_2$ is precipitated. Precipitation occurs by neutralizing the solution with a calcine, limestone, lime or other suitable neutralizing agent.

When neutralization takes place as a continuous process, as described in U.S. Pat. No. 3,656,941, the solution can be filtered well even though the dissolved silica is up to 50 g/l. On the other hand however, it is known that the solution is unstable with regard to silica and sooner or later the silica will start to precipitate from the solution as an unfilterable gel. Therefore such a process is risky on industrial scale since one must always be prepared for stoppages that over time lead to the uncontrollable precipitation of silica.

Another treatment method of siliceous zinc ore is described in U.S. Pat. No. 3,954,937, where in the siliceous material leaching the pH value of the solution is lowered gradually so that at the end of the leach it is about 1.5 i.e. the $H_2SO_4$ content is about 1.5-15 g/l. The reduction of the pH value is carried out so slowly that the silica is able to precipitate. In a continuous process the siliceous material is brought to the first reactor and the acid is added to each reactor in the direction of the slurry flow. The drawback of this method is that the process requires the extremely careful regulation of each reactor. If too much acid goes into one reactor, silica is precipitated uncontrollably and a precipitate difficult to filter is obtained.

The above-mentioned U.S. Pat. No. 4,148,862 describes a third method, where the leaching of a siliceous material is performed in a single reactor and the pH is held constant (maximum 2.5) throughout the duration of the leach. Residence time is prolonged until the silica is able to precipitate. Although it is not stated in detail in the patent, it is evident that the solution coming from this acidic leach must be neutralized after filtration before it can be transferred forward. In order for the amount of neutralizing agent to be kept to the minimum, it is of course worth keeping the pH in the leaching and precipitation stage of the siliceous material as high as possible.

SUMMARY

Now a method has been developed, whereby it has been made possible to eliminate the drawbacks of the above-mentioned processes. This method enables the treatment of silicate-containing zinc ores so that the highest possible zinc yield and a leaching residue that settles and filters well are obtained. It has been shown, surprisingly, that it is possible to obtain a leaching residue where the silica has excellent filtration properties. This result is achieved if an acidic leach, where the silicate is leached and precipitated as silica, is carried out so that the highest acid content (lowest pH) is at the start of the leaching and the lowest acid content (highest pH) is at the end of the leaching. In a continuous process this occurs so that the silicate-containing material is taken to a leaching stage containing several reactors, where the highest acid content is in the first reactor and the lowest acid content in the last reactor. The reactions are made to reach the end before the slurry is taken to the separation stage. The final pH of the leach is around the value of 1.5-2. The majority of the leaching occurs thus in a high acid content, where the silicate ion decomposes and dissolves and the leaching yield is excellent, and the silica precipitates quickly. Only at the end of the leach is the pH raised to the region where both dissolving and silica precipitation are slower. At this stage there are however already present $SiO_2$ nuclei formed in the early stage of the leaching, and these facilitate the precipitation of the silicate ion as silica.

BRIEF DESCRIPTION OF DRAWINGS

The method described herein is explained in more detail using the appended drawings, where.

DETAILED DESCRIPTION OF SPECIFIC EMBODIMENTS

Figure 1:
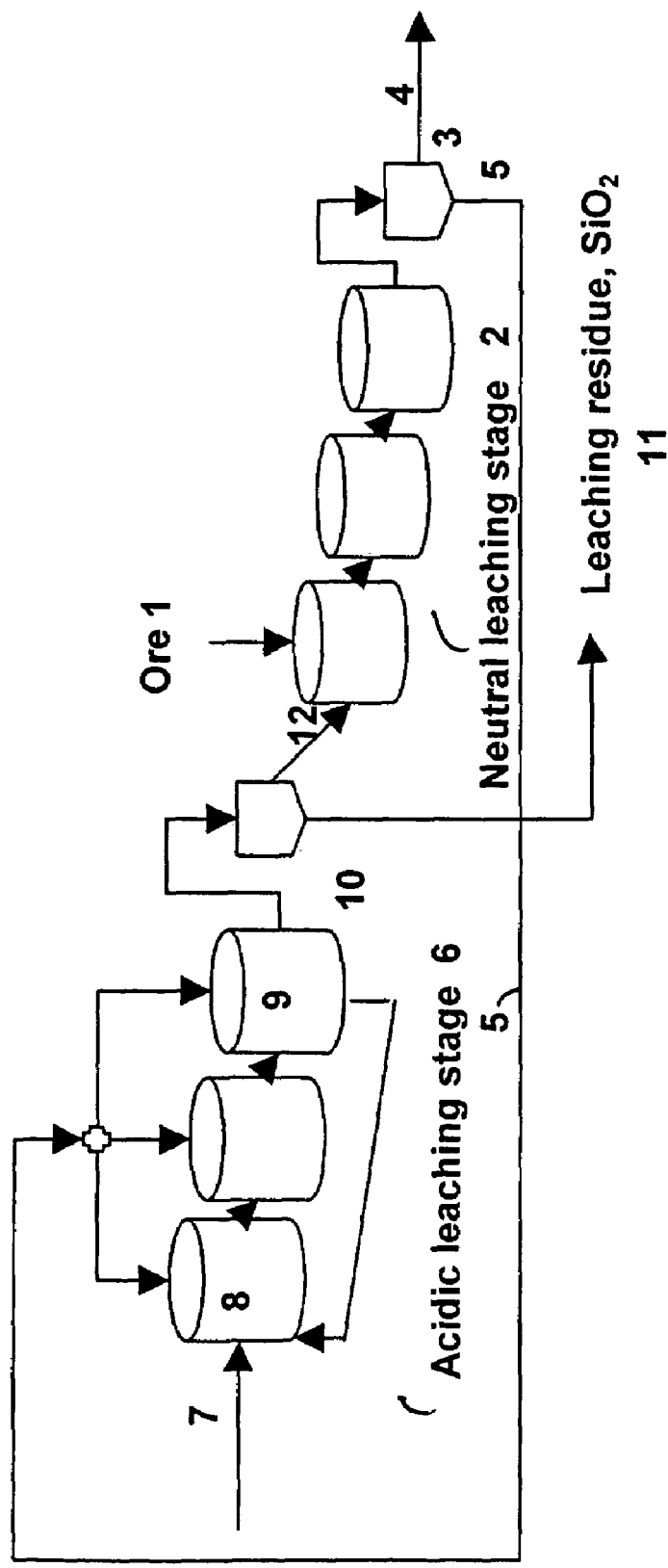
FIG. 1 is a flow diagram of one embodiment of the method described herein.

Flow sheet 1 presents a simplified illustration of a continuous leaching process of a silicate-containing raw material. This shows a method for the treatment of a silicate-containing ore, but obviously it can be adapted for the leaching of other silicate-containing materials. The ore 1 to be treated is first taken to a neutral leaching stage 2, where the ore is leached into a dilute sulfuric acid-zinc sulfate solution. Leaching occurs in atmospheric conditions. At this stage the easily soluble zinc compounds in the ore decompose and form zinc sulfate. At the end of the leach the pH of the solution should be sufficiently high, at a pH of about 5, for the further treatment of the zinc sulfate solution. If this value is not reached otherwise, the solution is neutralized for example with calcine (ZnO) or lime.

After the neutral leach the slurry is taken to separation of solution and solids. Separation occurs in a neutral leach thickener 3, from which a zinc sulfate solution is obtained as an overflow 4, which is taken via solution purification to zinc electrolysis for the production of elemental zinc (not shown in the drawing). A thickener underflow 5 contains silicates, which do not dissolve in neutral leach conditions. The underflow is routed to an acidic leaching stage 6. The acidic leach occurs using a return acid 7 from electrolysis, which contains 150-220 g/l of free sulfuric acid. The acidic leaching stage is carried out in a reactor series comprising several reactors. In the drawing there are three reactors, but in practice the number of reactors is selected so that the desired reactions proceed in them right to the end. The leaching stage is performed in atmospheric conditions at a temperature of about 60-100° C.

The return acid is largely all fed to the first reactor 8, wherein the pH in the first reactor is the lowest and the acid content therefore the highest. The silicate-containing precipitate 5 is routed to all the reactors in the reactor series so that the pH of the leaching stage is raised gradually towards the final reactor 9 of the stage, where the pH is around a range of 1.5-2. At a higher pH the leaching yield of zinc weakens. The precipitate 5 can be fed for instance to each reactor in equal amounts, whereby the pH of the slurry rises step by step as the leaching progresses. This is technically the easiest way to feed in the precipitate, but obviously it can be done in other ways as the need arises. The leaching time of silicate-containing precipitate in the acidic leaching stage is between 3-15 h.

From the final acidic leaching reactor the slurry is taken to solution and solids separation 10 i.e. thickening and filtration. The underflow obtained from the post-acidic leaching filtration i.e. the leaching residue 11 includes silica obtained from the silicates contained in the ore. The leaching residue is removed from the leaching circuit, but if needed this may also be recirculated back to the first reactor 8 of the acidic leaching stage. The overflow 12 from the filtration stage 10 is a zinc sulfate-sulfuric acid solution, with a sulfuric acid content of 5-15 g/l. The overflow is led to the neutral leaching stage 2 for neutralization by the ore 1 fed there.

Figure 2:
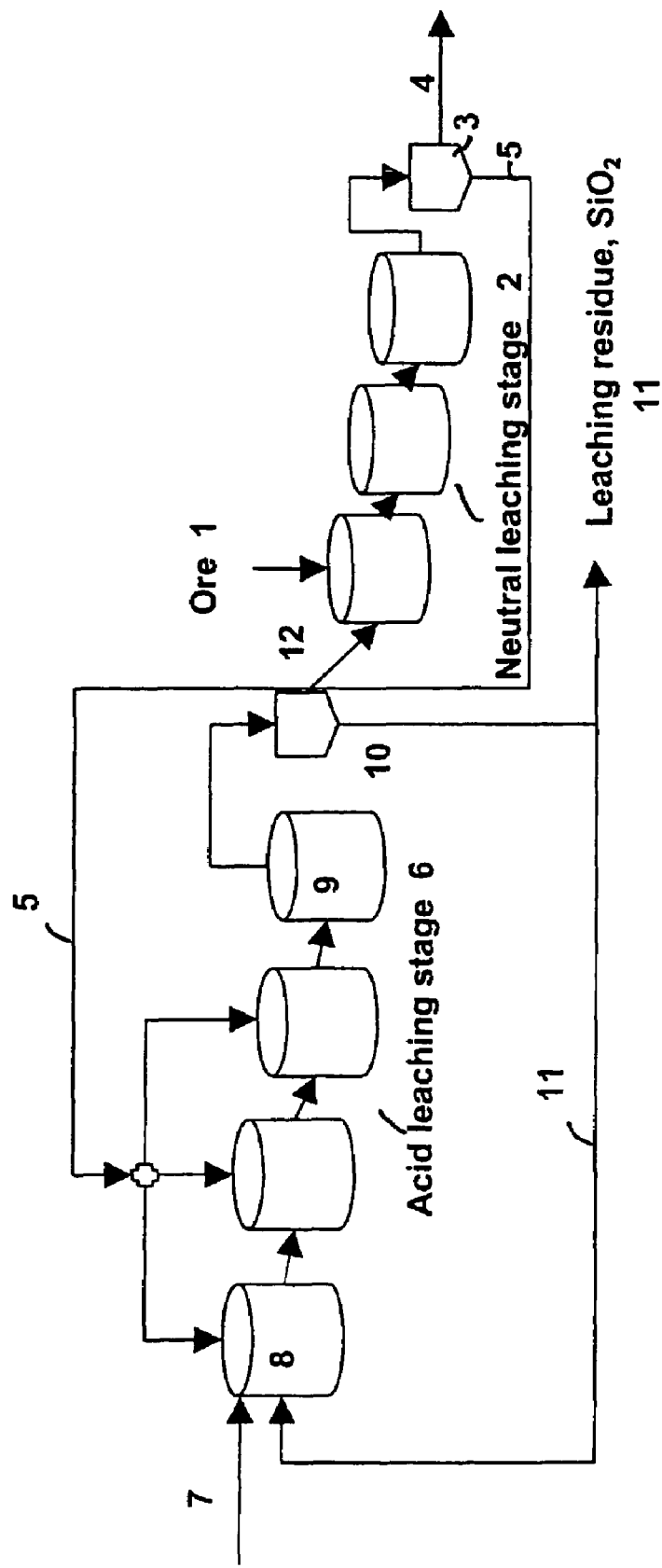
FIG. 2 is a flow diagram of another embodiment described herein.

The flow sheet in FIG. 2 is similar to that shown in FIG. 1 except that in this case the precipitate 5 is no longer taken to the final reactor 9 of the acidic leaching stage 6. If the reactions occurring in the leaching stages continue in the thickener, they will disturb the operation of the thickener. When solids are no longer taken to the final reactor, the reactions have time to proceed to completion there and there are no unreacted solids left in the slurry to be taken to the thickener. If for example the dissolving of carbonates continues even in the thickener, the gaseous carbon dioxide ($CO_2$) released could form a layer of foam on the surface of the thickener and prevent the separation of solids. The flow sheet also shows that the reactor slurry may be recirculated in the acidic leaching stage so that the slurry from some of the reactors at the final end of the flow direction is recirculated to the first reactor of the stage. In the case shown in FIG. 2 the slurry is recirculated from the solids separation stage 10 to the first reactor 8 of the acidic leach.

One way to implement the method of this invention is to carry out leaching in batches, whereby in principle only one leaching reactor is needed, which is filled first with return acid, and silicate-containing slurry is fed into the return acid so that the pH of the slurry rises step by step. In this way the acid gradient is as even as possible, but in industrial implementations the continuous process is generally the most economical method.

The process can also be utilized in such cases where a zinc liquid-liquid extraction follows the leaching stages described above. The use of extraction becomes relevant if the Zn content of the ore is so low that the water balance of the normal Zn process is difficult to control, because the high amounts of wash water dilute the solution too much. In such a case it is economically advantageous to operate at a low temperature, even at room temperature, because a high temperature in extraction is harmful, in contrast to the normal Zn process.

The method described herein is further illustrated with the aid of the following non-limiting examples:

EXAMPLE 1

A test was performed as a batch, where silicate-containing ore was added evenly to a solution of return acid. The ore contained the following: $SiO_2$ 15.5%, Zn 27% and Pb 6.5%. The $H_2SO_4$ content of the return acid solution was 195 g/l and the Zn content 52 g/l. Ore was added over a period of 7 h, after which the pH of the solution was 1.5 and its $H_2SO_4$ content 7.8 g/l. The amount of ore added was 345 g per liter of return acid. The temperature of the batch was 90° C.

After leaching, 120 mg of flocculants per kg of leaching residue were added to the slurry and settled using a rake. The underflow from the settling test was filtered and washed in a membrane pressure filter. The filtration capacity was 98 kg/m$^2$ h and the solids content of the underflow was 550 g/l. The analysis of the leaching residue was as follows: Zn 1.3%, Pb 13.6% and $SiO_2$ 31.9%. The $SiO_2$ content of the filtration overflow, a zinc sulfate solution, was 460 mg/l. The leaching yield of zinc was 97.3%.

EXAMPLE 2

A test was performed on a continuous basis using the apparatus shown in FIG. 1. The composition of the return acid was the same as in example 1. The return acid was fed into the first reactor of the acidic leach at a rate of 1 l/h. Ore was fed into the neutral leaching stage at a rate of 360 g/h. The neutral leaching stage underflow was divided between the acidic leaching stage reactors so that seen from the direction of the flow the $H_2SO_4$ content in the various reactors came to 130, 70 and 10 g/l and these corresponded to pH levels of 0.4, 0.8 and 1.5. There was a residence time of 3 h in each reactor and the temperature was 90° C.

The results of the tests were as follows: Zn yield was in the region of 97.8-98.4%. Thickening was carried out after the acidic leaching, which produced an underflow with a solids content of 540-680 g/l. A pressure filtration capacity of 96-128 kg/m$^2$ h was achieved. Filtration tests were made without dilution, and so the specific weights of the solution were between 1.38-1.41 g/cm$^3$. The $SiO_2$ content of the zinc sulfate solution obtained as the filtration overflow was 350-550 mg/l.

In addition several vacuum filtration tests were made, which gave a filtration capacity of 60-100 kg/m$^2$ h, when thickening was made with a diluted solution. This represents the use of a combination washing-thickener i.e. the acidic leaching slurry was washed before thickening. The specific weight of the solution going to thickening was about 1.25 g/cm$^3$ and the moisture content of the precipitate obtained was about 35%.

The examples show that the results are of the same order as in a zinc process, where a calcine prepared from a sulphidic concentrate with a silicate content of the order of 1-1.5% is used.

When the results of the above-mentioned examples are compared with those for example obtained using the U.S. Pat. No. 4,148,862 method, it can be seen that the underflow obtained from filtration after acidic leaching has a solids content of around 500 g/l, whereas in the above-mentioned US patent it is only in the region of 200 g/l. In the same US patent the moisture content of the precipitate is over 60% (wet cake 33.7 g and dry cake 12.3 g), whereas in the method according to the invention it is in the region of 35%. The results are very valuable for industrial operation, since in the method of the invention the solution flows are reduced and the amount of wash water is decreased compared with the methods of the prior art. This is very important when using a raw material that produces 3-4 times more leaching residue to be washed per tonne of zinc formed than a normal zinc sulfide process The examples given above are only various ways to make use of the method of the invention, and clearly there are also other ways to exploit it. The method is not limited to the residence times or other parameters given in the examples.

The invention claimed is:

1. A method of leaching zinc-bearing siliceous raw materials for the recovery of zinc, comprising:
   a) feeding a zinc-bearing siliceous raw material having a silica content of at least 15.5 wt %, based upon the weight of the zinc-bearing siliceous raw material, to a neutral leaching stage;
   b) decomposing easily soluble zinc compounds in said zinc-bearing siliceous raw material by contacting said zinc-bearing siliceous raw material with a neutral leaching solution to form a zinc-depleted precipitate and a zinc sulfate solution;
   c) separating said zinc sulfate solution from said zinc-depleted precipitate;
   d) subjecting said zinc sulfate solution to electrolysis to form elemental zinc;
   e) leaching said zinc-depleted precipitate with a stream of aqueous acid in an acidic leaching stage comprising a series of reactors that include a first reactor and a final reactor to convert silicates in said zinc-depleted precipitate to silica, comprising:
      (1) introducing a feedstock consisting essentially of said zinc-depleted precipitate to at least said first reactor in said series;
      (2) introducing the entire stream of aqueous acid into said first reactor to form a slurry with said zinc-depleted precipitate and transferring said slurry entirely from said first reactor to a next reactor in said series, until said slurry is entirely transferred to said final reactor;
      (3) gradually increasing the pH of each reactor from said first reactor through said final reactor, such that said pH in said final reactor is about 1.5-2;
      (4) removing an acid-leached slurry from said final reactor;
      (5) separating said acid-leached slurry into an underflow containing said silica and an overflow containing zinc sulfate and sulfuric acid; and
      (6) introducing said overflow directly to said neutral leaching stage such that said neutral leaching solution comprises said overflow.

2. A method according to claim 1, wherein said neutral leaching solution is a dilute sulfuric acid-zinc sulfate solution.

3. A method according to claim 1, further comprising neutralizing said zinc sulfate solution to a pH of about 5.

4. A method according to claim 1, wherein said separating of said zinc-depleted precipitate from said zinc sulfate solution occurs in a neutral leach thickener.

5. A method according to claim 2, wherein said dilute sulfuric acid-zinc sulfate solution comprises said overflow from said separating of said acid-leached slurry.

6. A method according to claim 1, wherein the zinc-depleted precipitate in the acid leaching stage is leached at a temperature of 60-100° C.

7. A method according to claim 1, wherein there are $SiO_2$ nuclei in the slurry in said final reactor.

8. A method according to claim 1, wherein the zinc-containing siliceous raw material is leached in a continuous process.

9. A method according to claim 1, wherein the stream of aqueous acid in the leaching of the zinc-depleted precipitate is an electrolysis return acid.

10. A method according to claim 1, wherein an equal amount of the zinc-depleted precipitate is introduced to each reactor in the series of reactors in the acidic leaching stage.

11. A method according to claim 1, wherein none of the zinc-depleted precipitate is introduced to the final reactor in the series of reactors in the acidic leaching stage.

12. A method according to claim 1, further comprising recirculating at least a portion of said acid-leached slurry to the first reactor in the series of reactors in the acidic leaching stage.

13. A method according to claim 1, wherein the zinc-depleted precipitate is leached in the acid leaching stage for a leaching time of 3-15 hours.

14. A method according to claim 1, wherein the zinc-depleted precipitate is acid leached in a batchwise manner, whereby all of the zinc-depleted precipitate is introduced into a reactor containing said aqueous acid in a way that the pH of the resulting slurry rises step by step.

15. A method according to claim 1, wherein the zinc-bearing siliceous raw material is zinc ore.

16. A method according to claim 1, wherein the zinc-bearing siliceous raw material is zinc-bearing slag.

17. A method according to claim 1, wherein the overflow solution obtained from the acid leaching stage contains silica in an amount of 350-550 mg/L.

* * * * *